(12) United States Patent
Levi (10) Patent No.: US 6,764,268 B2
(45) Date of Patent: Jul. 20, 2004

(54) LADDER RACK ASSEMBLY (76) Inventor: Avraham Y. Levi, 757 Decorah La., St. Paul, MN (US) 55120

( * ) Notice: Subject to any disclaimer, the term of this patent is extended or adjusted under 35 U.S.C. 154(b) by 0 days.

(21) Appl. No.: 10/368,723

(22) Filed: Feb. 19, 2003

(65) Prior Publication Data
US 2003/0175101 A1 Sep. 18, 2003

Related U.S. Application Data
(60) Provisional application No. 60/359,088, filed on Feb. 22, 2002.

(51) Int. Cl.[7] .............................. B60P 9/00; B60P 1/00; B65F 1/00; B65F 3/00
(52) U.S. Cl. ...................... 414/462; 414/546; 224/310
(58) Field of Search .............................. 414/462, 546, 414/680; 224/310, 315, 324

(56) References Cited

U.S. PATENT DOCUMENTS

| | | | | |
|---|---|---|---|---|
| 5,398,778 A | * | 3/1995 | Sexton | 224/310 |
| 6,092,972 A | * | 7/2000 | Levi | 414/462 |
| 6,099,231 A | * | 8/2000 | Levi | 414/462 |
| 6,315,181 B1 | * | 11/2001 | Bradley et al. | 414/462 |
| 6,427,889 B1 | * | 8/2002 | Levi | 414/462 |

* cited by examiner

Primary Examiner—Gene O. Crawford
(74) Attorney, Agent, or Firm—Thomas J. Nikolai; Nikolai & Mersereau P.A.

(57) ABSTRACT

To reduce the energy needed to unload and reload ladders from and onto the roof of utility vehicles, a ladder rack assembly has been devised which minimizes the movement of the center of gravity of the ladder load when going between a first position atop the vehicle to a second position along a vertical side of the vehicle. To achieve this advantage, the rear and front four-bar linkages are driven by a rotatable drive shaft such that a ladder support member of the front four-bar linkage is at a higher elevation than the ladder support member of the rear four-bar linkage when the two are aligned with the side of the vehicle.

6 Claims, 11 Drawing Sheets

LADDER RACK ASSEMBLY

CROSS-REFERENCE TO RELATED APPLICATION

This application claims priority to provisional patent application Serial No. 60/359,088, filed Feb. 22, 2002.

BACKGROUND OF THE INVENTION

I. Field of the Invention

This invention relates generally to vehicle mounted roof racks for transporting loads, and more particularly to a movable ladder rack that can be used to readily raise and lower a ladder onto and from the roof of a motor vehicle, such as a truck or van.

II. Discussion of the Prior Art

In my earlier U.S. Pat. Nos. 5,297,912, 6,092,972, 6,099,231 and in my currently pending application Ser. No. 09/758,729, filed Jan. 11, 2001, the teachings of which are hereby incorporated by reference, there are described different designs of truck or van-mounted ladder racks that facilitate the loading and unloading of one or more ladders with respect to the vehicle's roof. These devices comprise front and rear four-bar linkage assemblies that include a stationary member which is adapted to rigidly affixed to the vehicle's roof or to cross-members that clamp to the vehicle's roof, and a ladder support member pivotally joined to the stationary member by a pair of transversely spaced links. A drive shaft is journaled for rotation in the stationary members of the front and rear four-bar linkage assemblies and is rigidly affixed to one of the pair of links of the front and rear four-bar linkage assemblies. Thus, when the drive shaft is rotated, either manually with a crank or automatically by means of a motor, ladders resting on the front and rear ladder support members are lifted and rotated from a position parallel to the vehicle's roof to a position parallel to the vehicle's side during an unloading maneuver. When reloading ladders onto the vehicle, the drive shaft is rotated in an opposite direction to raise and rotate the ladder load onto the vehicle's roof.

In my earlier designs described in the aforereferenced patents, the four-bar linkages have been designed such that the top and foot of the ladders remain generally horizontal throughout their range of motion as the drive shaft is rotated. This design featured significant lowering of the ladder's center of gravity, thus requiring still significant forces.

While the earlier designs reflected in the above-listed patents greatly simplify the loading and unloading of heavy extension ladders onto and from transport vehicles, it is deemed advantageous to provide a rotatable ladder rack assembly for a motor vehicle that requires less force to be applied during the unloading and reloading operations.

SUMMARY OF THE INVENTION

In accordance with the present invention, I have redesigned the frontmost four-bar linkage assembly so that as a ladder load is transferred from the vehicle's roof to its position alongside the vehicle, the front or top end of the ladder is at an increased elevation relative to its foot such that the ladder is inclined relative to the horizontal. The height drop from a roof top position to the lowered disposition is reduced and, therefore, requires less force to operate. With the inclined position, the ladder feet are lowered further and the user is then better able to grasp the ladder at its foot end while the top or front end thereof is still engaged and supported by the front ladder support member. The foot of the ladder can be lifted free of the rear ladder support member and lowered to the ground. Because the top end of the ladder is still being supported by the front ladder support member, less force is required to accomplish the maneuver.

The user may then move to a location along the side of the vehicle to the approximate center of mass of the ladder, whereupon the front portion of the ladder is lifted to disengage it from the front ladder support member and the ladder can be carried to the worksite.

DESCRIPTION OF THE PREFERRED EMBODIMENT

Figures 1A, 1B, 1C:
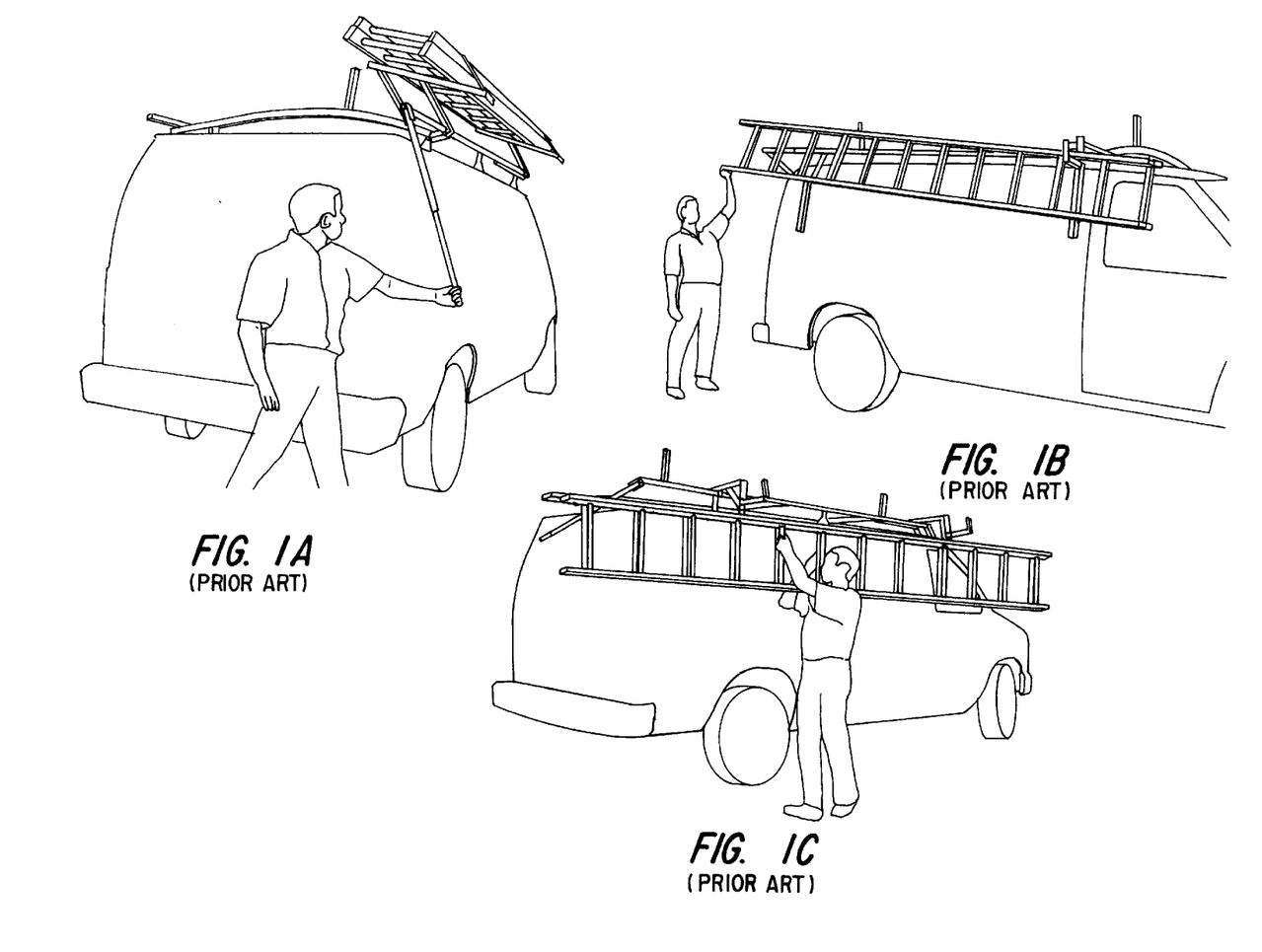
FIGS. 1A through 1C illustrate a sequence in lowering a ladder from the roof of a vehicle to a location along side the vehicle using my prior art ladder rack assembly.
Figure 2:
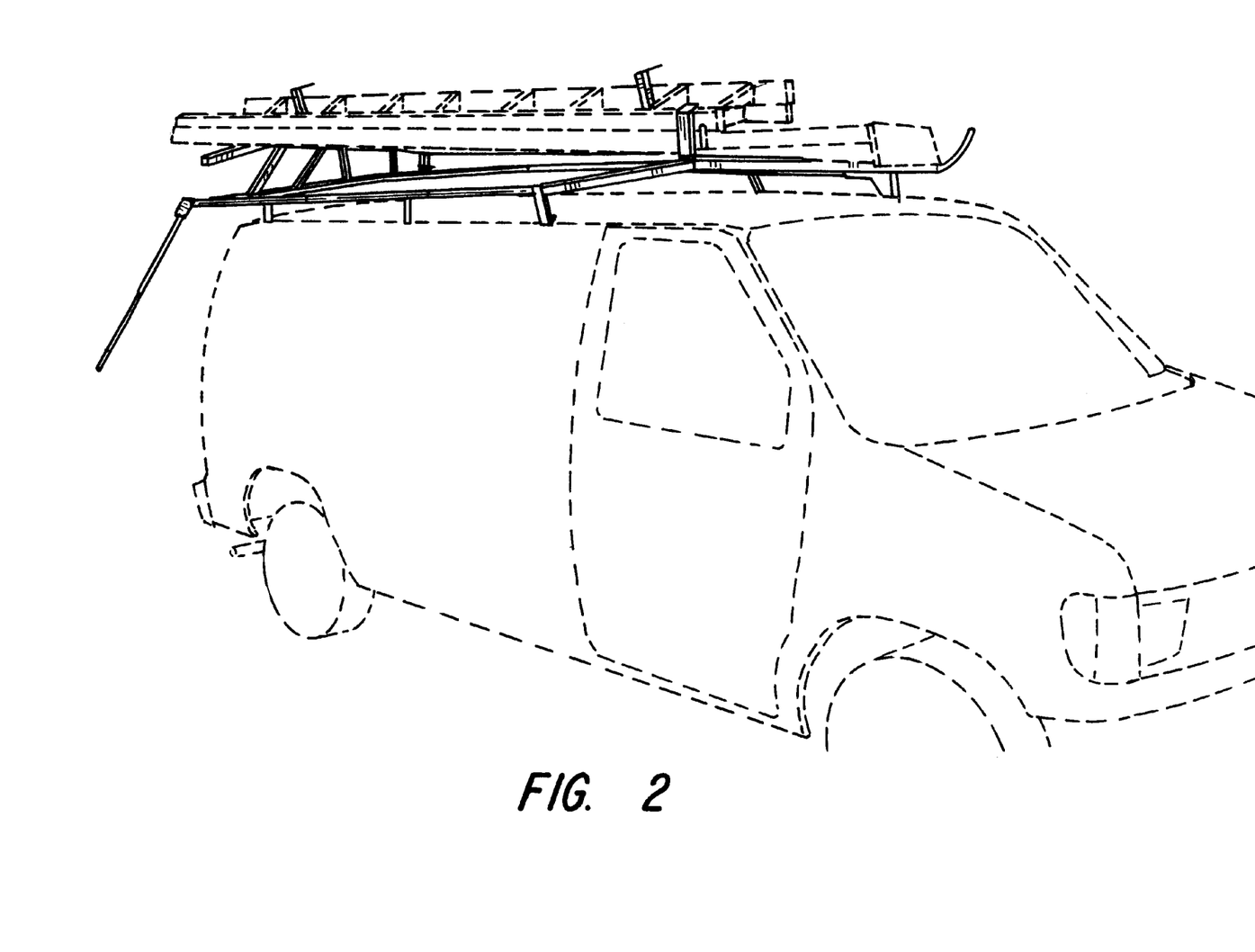
FIG. 2 is a frontal perspective view of a utility vehicle on which the ladder rack assembly of the present invention is installed with an extension ladder mounted thereon and located generally parallel to the vehicle's roof.
Figure 3:
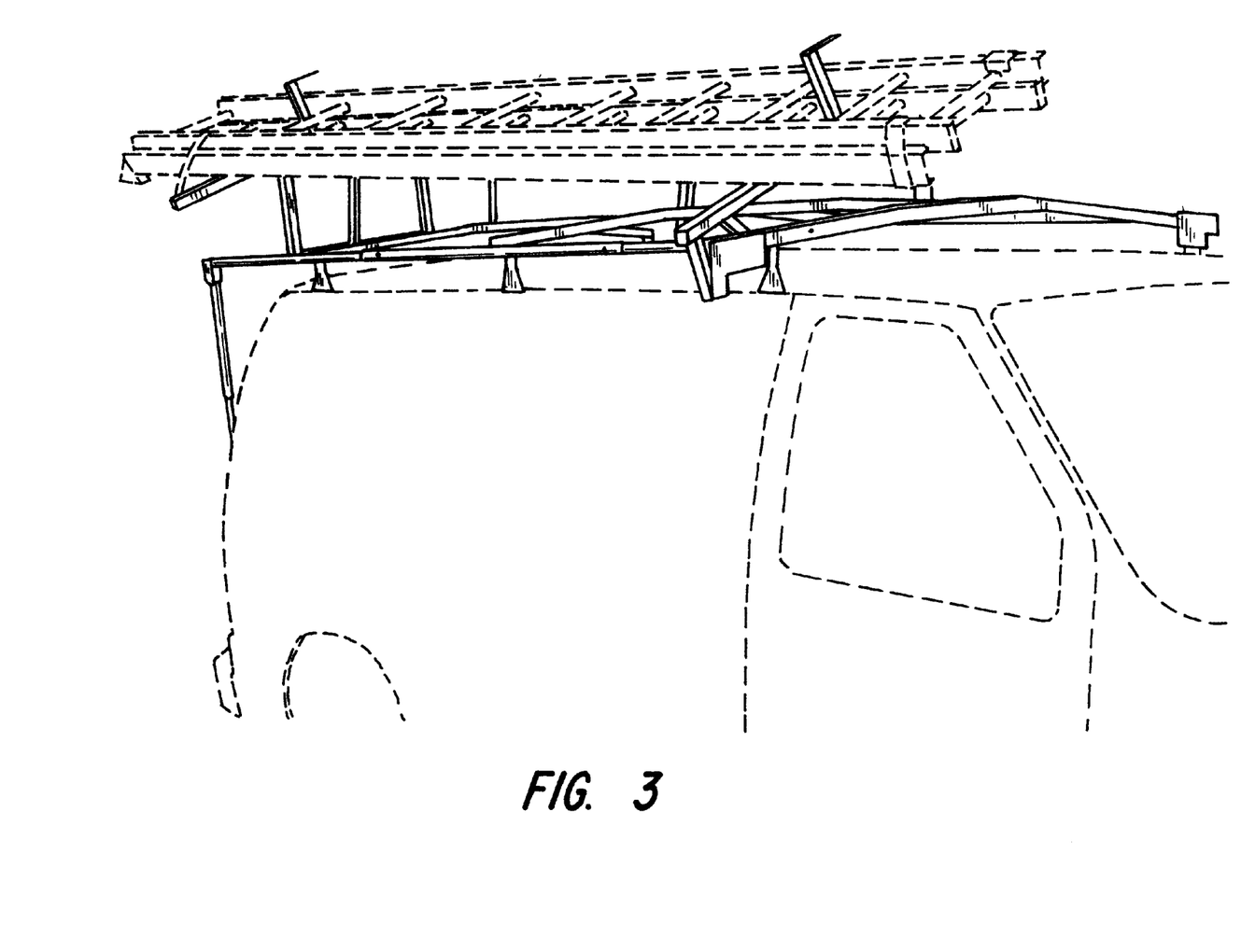
FIG. 3 is a frontal perspective view as in FIG. 2 but showing the ladder's partially elevated and rotated relative to the top of the vehicle.
Figure 4:
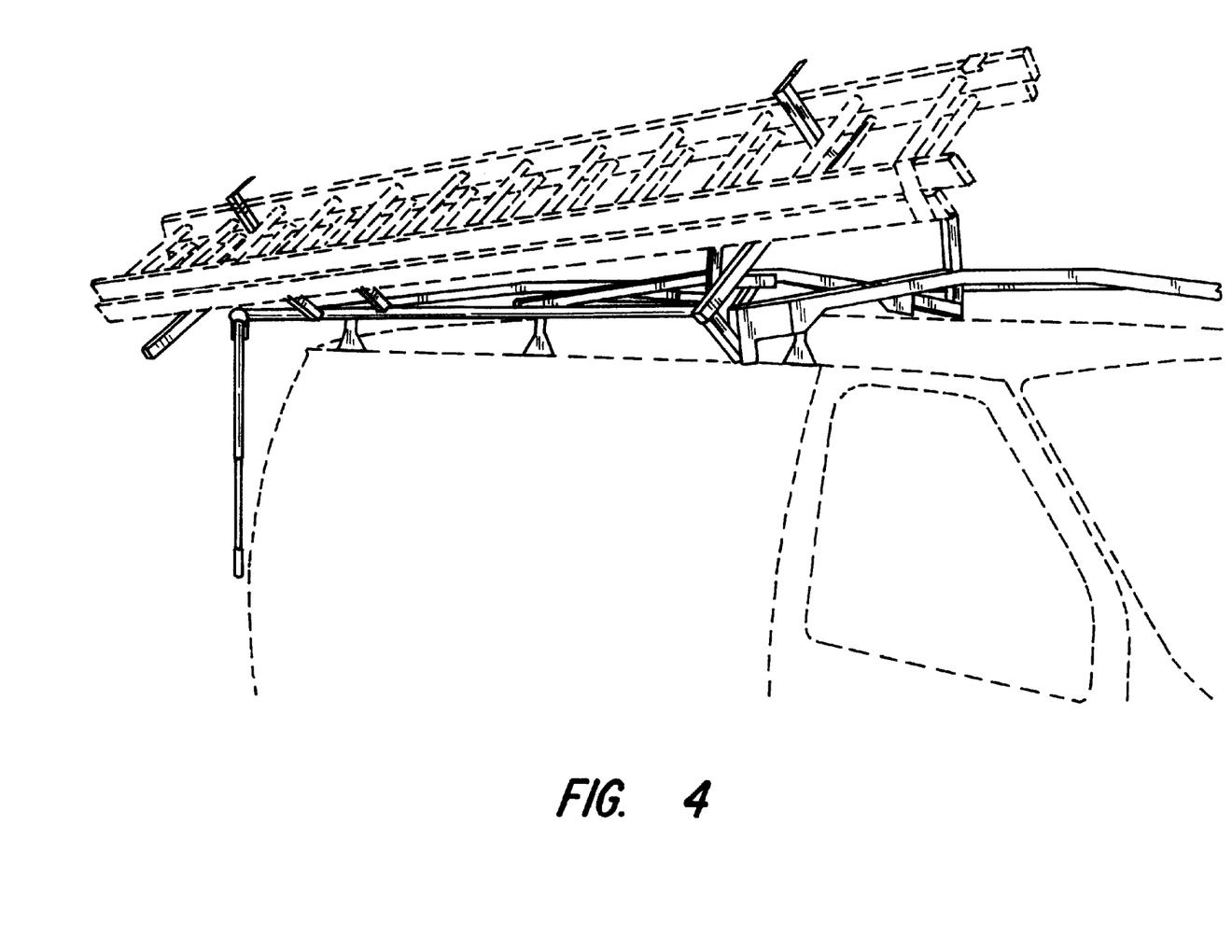
FIG. 4 is a further view showing the ladder rack assembly being used to lower a ladder from the vehicle's roof at a predetermined point during its lowering sequence.
Figure 5:
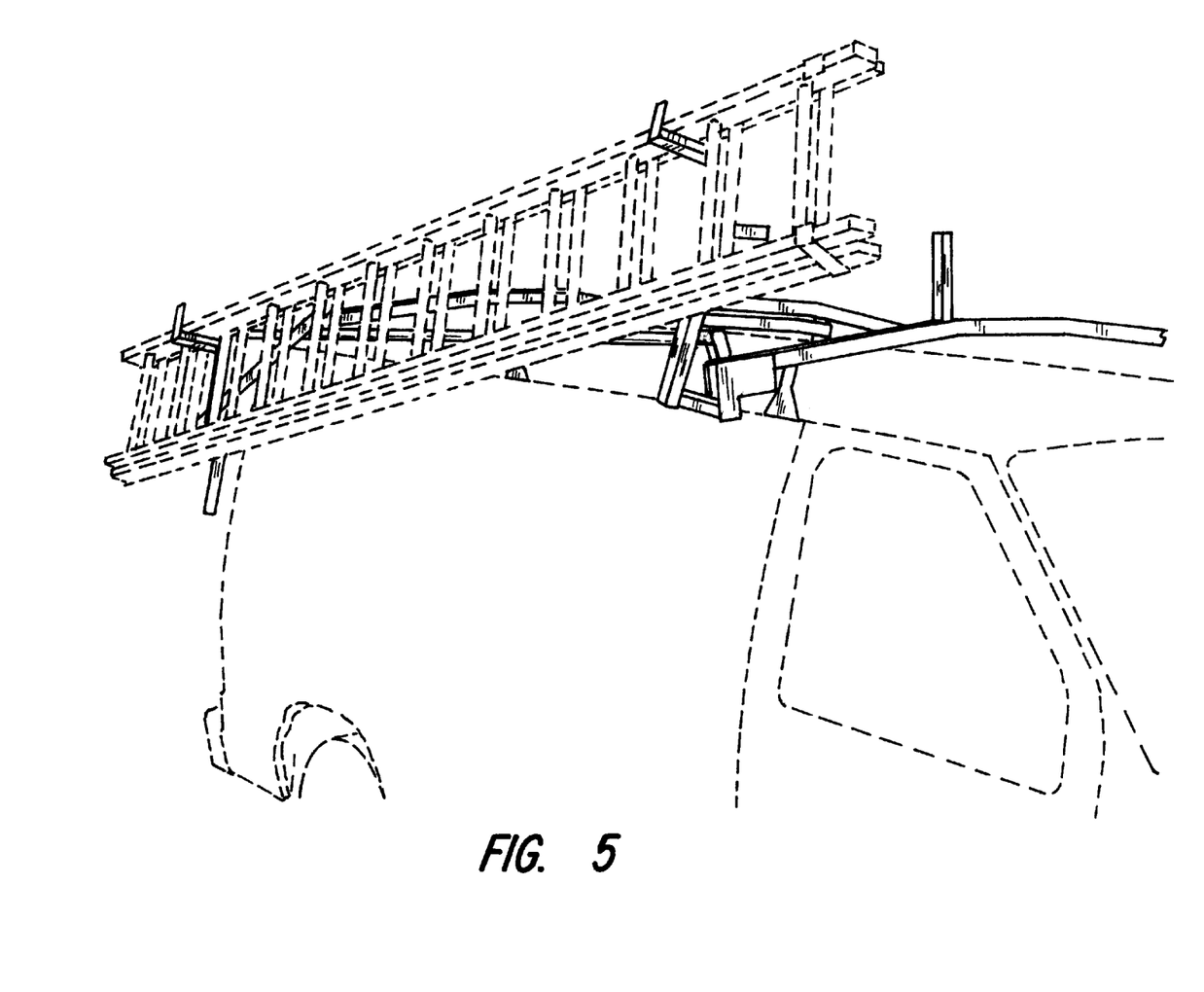
FIG. 5 is a further view of a ladder and the ladder rack assembly where the ladder is now positioned adjacent the vehicle's side and with the foot of the ladder at a lower elevation than its head end.

Before describing the preferred embodiment of the present invention, attention is first directed to FIGS. 1(A) through 1(C) which show the prior art ladder rack being used to transition a ladder load from a disposition atop a vehicle's roof to a lowered disposition alongside the vehicle and where the ladder is shown as being removed and carried away as to a worksite. The important thing to note from the views of FIG. 1 is that when the ladder rack has been transitioned by rotation of the handle so that the ladder load is adjacent the side of the vehicle, the ladder is in a level or horizontal disposition, requiring the user to shift the ladder free of the ladder rack assembly onto his shoulder when carrying the ladder to a worksite. Given the fact that a conventional 12-foot extension ladder made of fiberglass may typically weigh about 60 lbs., it requires some strength and dexterity to properly remove, balance and carry the ladder once the ladder has been lowered using the prior art ladder rack.

Referring next to the photographs labeled FIGS. 2–6, there is illustrated the use of the ladder rack of the present invention in lifting a ladder from its stowed disposition (FIG. 2) atop the vehicle's roof to a location alongside the vehicle prior to the ladder being removed from the ladder rack assembly. Particular attention should be paid to the manner in which the ladder rack assembly of the present invention causes a ladder to be inclined to the horizontal when in its lowered disposition as in FIG. 6.

Figure 6:
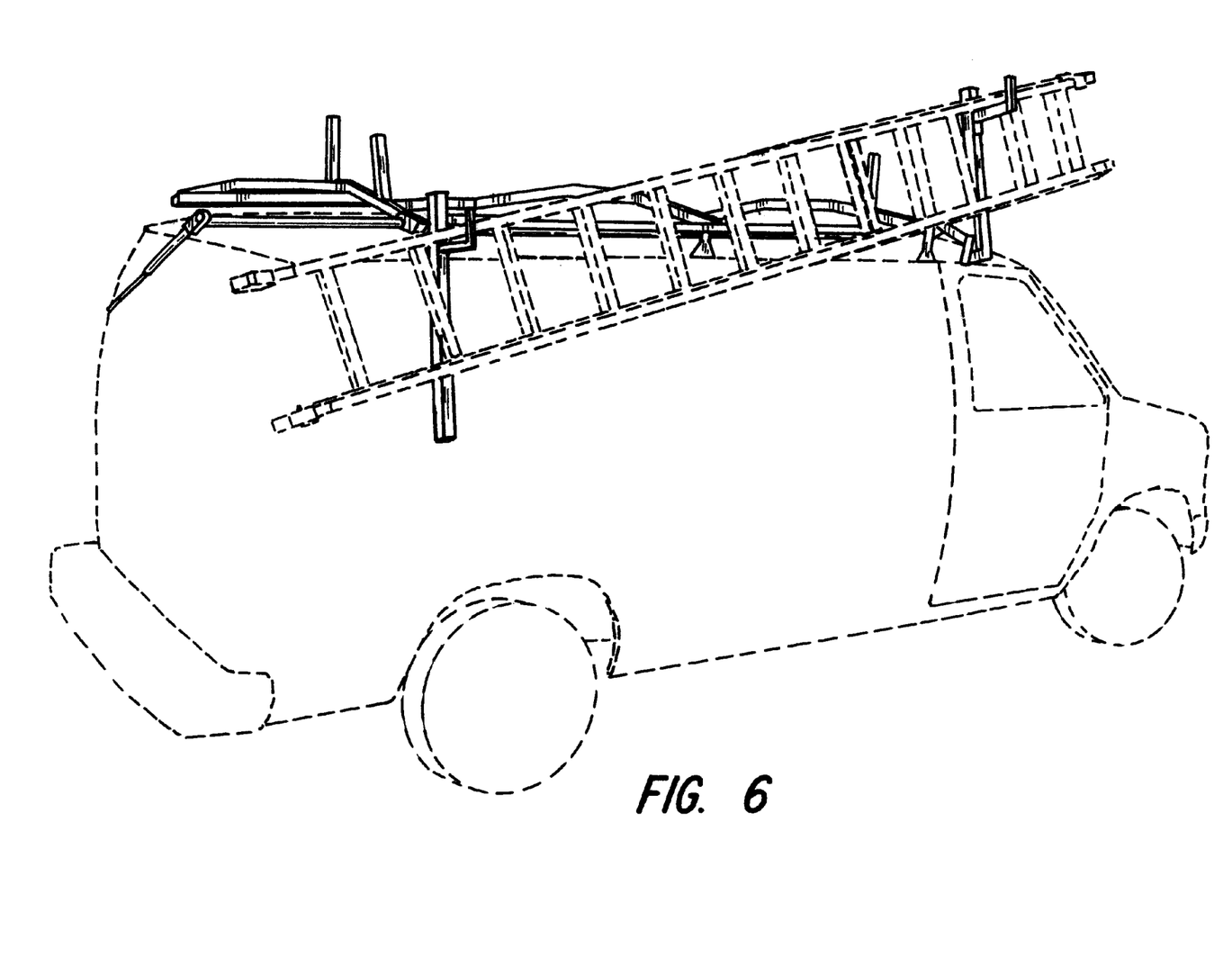
FIG. 6 is a side view of a truck on which the present invention is installed and showing the ladder rack in its lowered disposition.

When the ladder is in the disposition illustrated in FIG. 6, a workman can readily lift the foot of the ladder free of the rear ladder support member while maintaining the top portion of the ladder hooked in place on the front ladder support member. Thus, the ladder acts as a lever of the second class allowing much less effort to lower the foot of the ladder to the ground than is required to completely lift the ladder free of the ladder rack assembly as in the prior art arrangement.

With the foot of the ladder resting on the ground, the workmen can move forward and lift the top end of the ladder free of the front ladder rack assembly and gently lower the ladder to the ground.

Figure 7A:
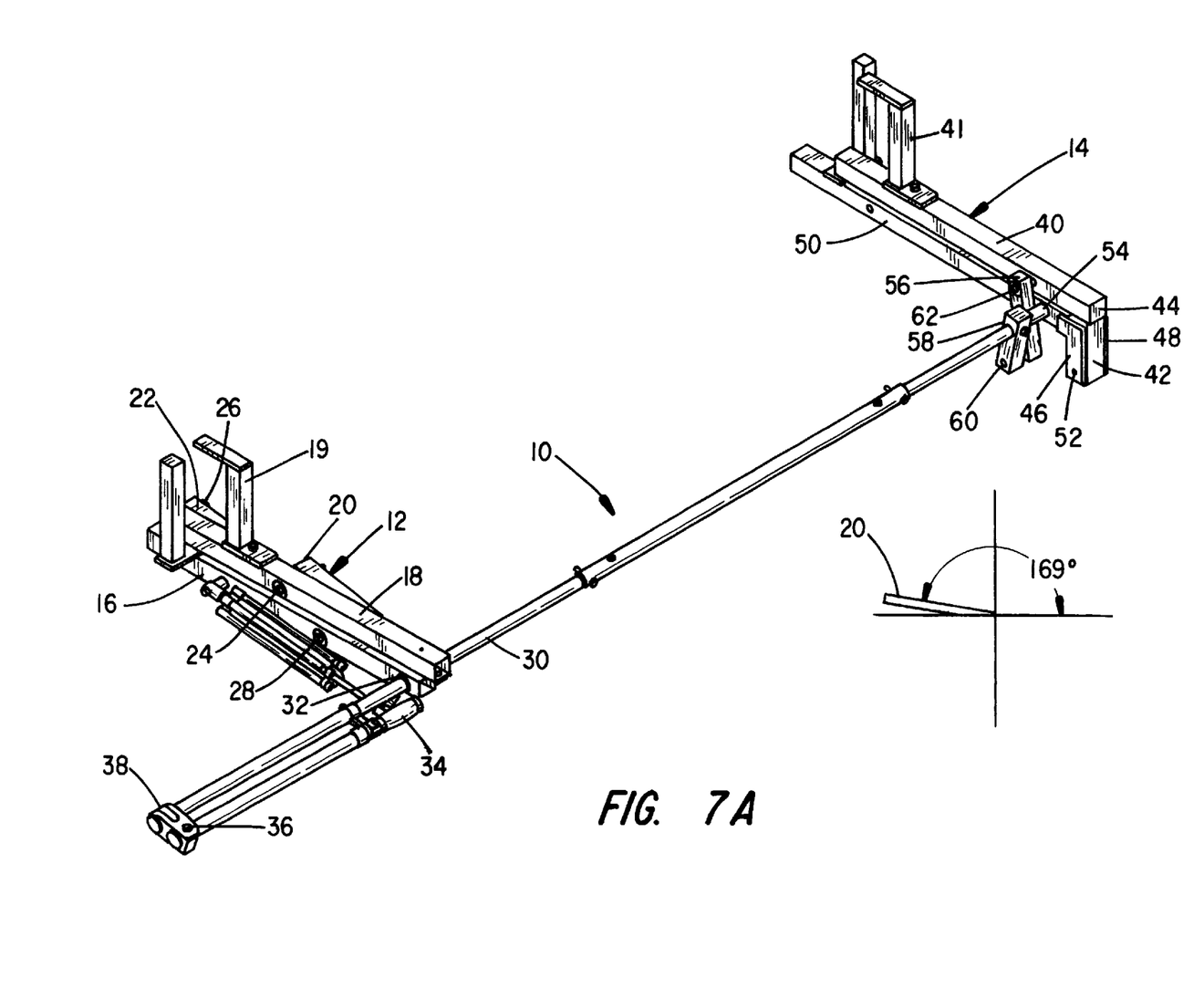
FIGS. 7(A) through 7(E) are perspective views of the preferred embodiment of the present invention at different angular dispositions in traversing from a raised, ladder transport position to a lowered, ladder unloading position.
Figure 7B:
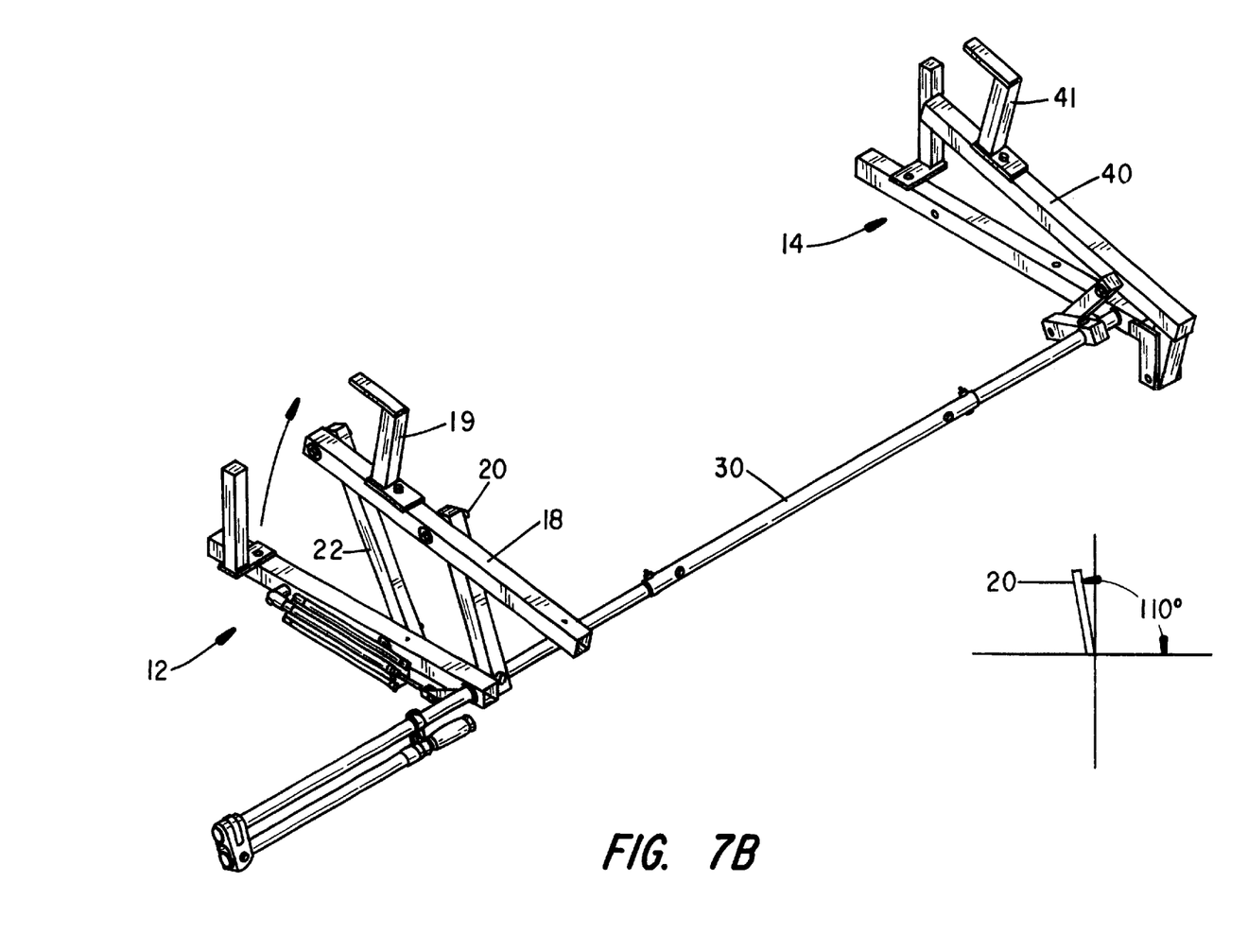
Figure 7C:
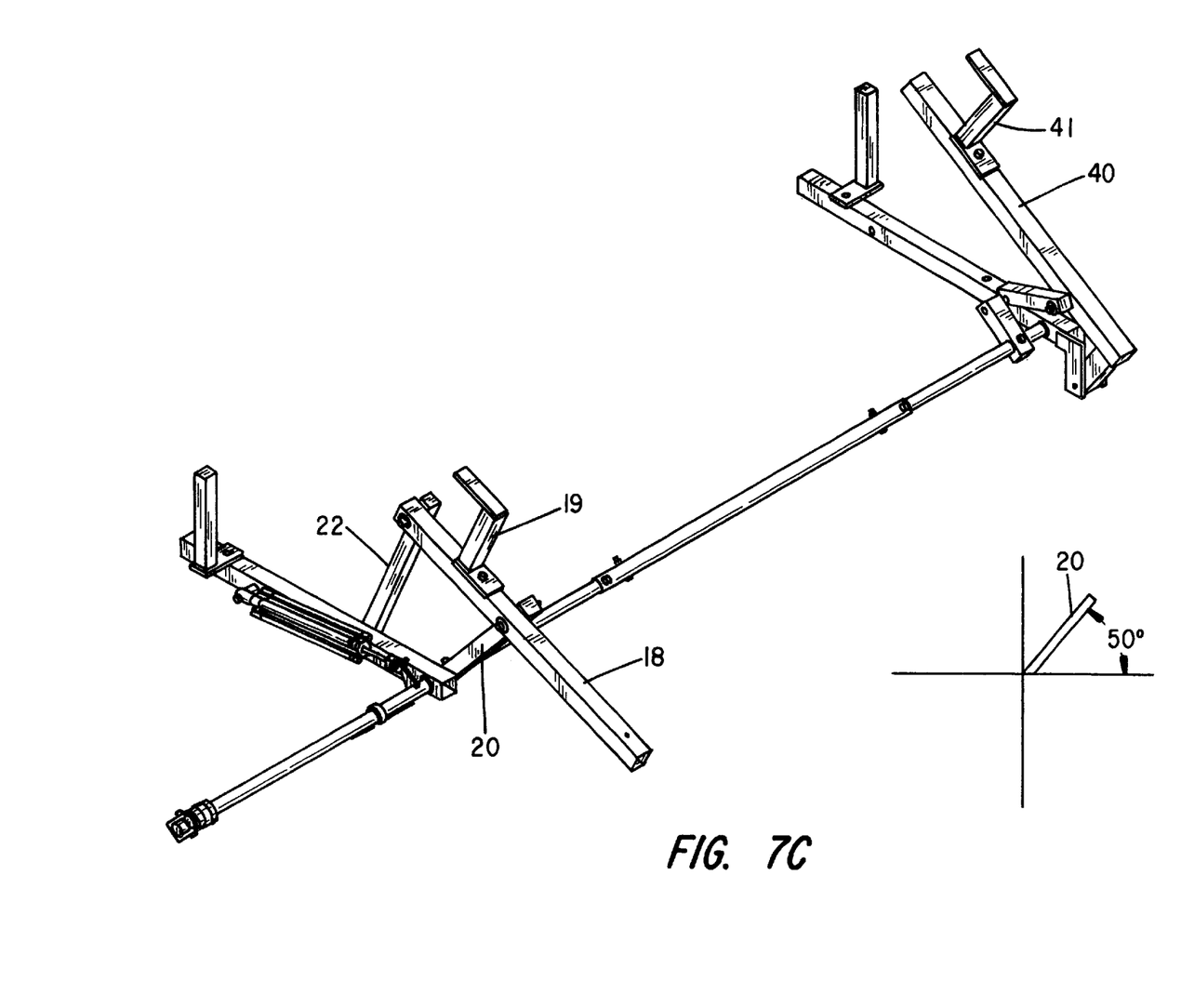
Figure 7D:
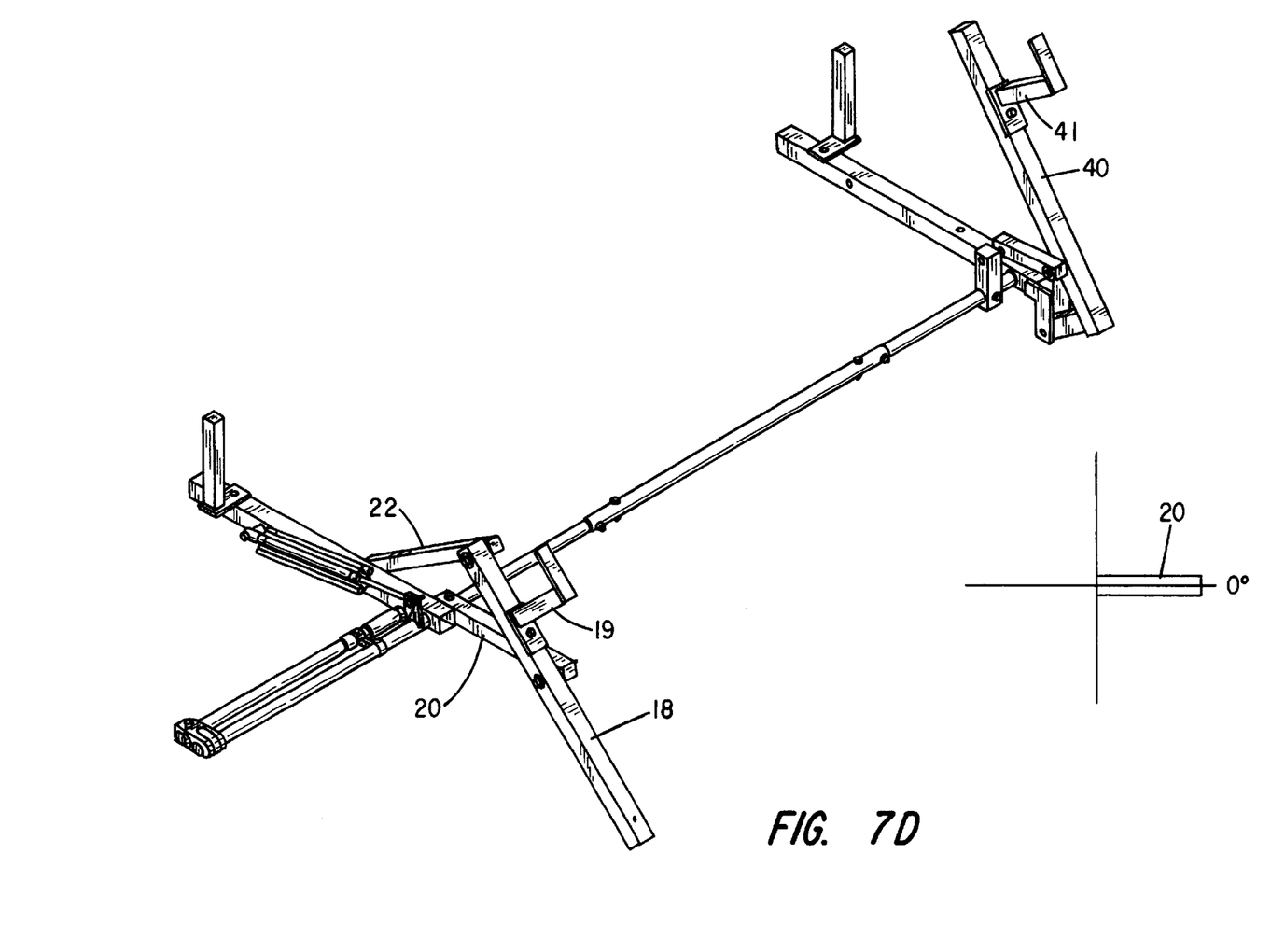

Referring now to FIG. 7(A), there is indicated generally by numeral 10 a ladder rack assembly constructed in accordance with the present invention. It includes a rear four-bar linkage assembly 12 and a front four-bar linkage assembly 14. In my prior art arrangements, the four-bar linkage assemblies 12 and 14 are substantially identical. However, in the case of the present invention, this is not true.

The rear four-bar linkage assembly 12 is seen to include a first rigid tube 16 of generally rectangular cross-section. This member is usually attached to a cross-bar that extends transversely across the roof of the vehicle and is anchored at each end to the vehicle. A second rectangular bar comprises a movable ladder rest 18 and it is coupled to the stationary bar member 16 by a pair of link members, including links 20 and 22. The link 20 is pivotally secured to the ladder rest member 18 by a pin 24 located proximate the midpoint of the member 18. The link 22 is likewise pivotally joined to the ladder rest member 18 by a pin 26 disposed near the inner end of member 18 with the other end of the link 22 being pivotally coupled to the stationary member 16 by a pin 28. The other end of the link 20 is rigidly affixed to a drive shaft 30 that is journaled for rotation in bearings 32 disposed in the stationary bar member 16 proximate its end. A foldable handle 34 is pivotally joined at 36 to a coupling 38 affixed to the end of the drive shaft 30 to facilitate its being rotated. Rotation of the drive shaft in a clockwise direction, when viewed as in FIG. 7(A) will apply a torque to the linkage 20 causing it to rotate clockwise to thereby lift the ladder support member 18 relative to the vehicle's roof.

The four-bar linkage assembly 14 differs from the four-bar linkage assembly 12 in that the ladder rest member 40 has an offset member 42 welded to it proximate its outer end 44. Straddling the tubular stub comprising the offset member 42 are two right angle brackets 46 and 48 that are welded to a stationary bar member 50 adapted to be affixed to a front cross-bar member whose opposite ends are clamped to the vehicle's roof. A hinge pin 52 extends through the brackets 46 and 48 and through the offset member 42, thereby permitting the ladder rest member 40 to swing about the pin 52 as a center.

The front end of the drive shaft 30 is journaled in bearings 54 disposed in the stationary member 50. Affixed to the drive shaft is a bell crank assembly that comprises a linkage 56 and a linkage 58, where the two are pivotally joined by a pin 60. The linkage 56 is also pivotally joined to the ladder rest member 40 by a pin 62.

It will seen, then, that as the handle 34 is used to rotate the drive shaft in a clockwise direction, the combined action of the links 56 and 58 will be to pivot the ladder rest member 40 in a clockwise direction about the hinge pin 52.

Figure 7E:
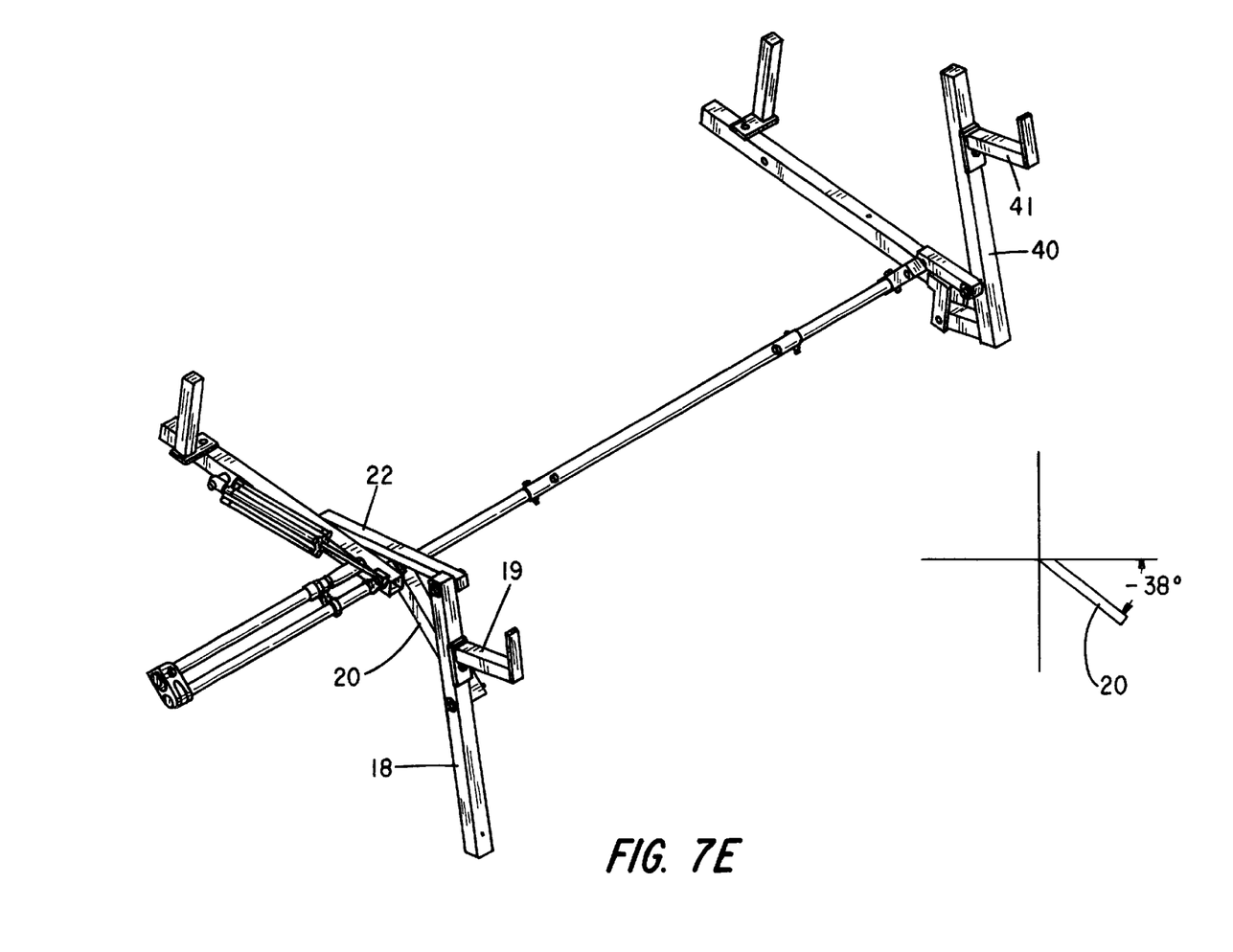

The kinematic design of the four-bar linkages 12 and 14 is such that as the rear ladder rest member 18 rotates slightly less than 90° in going from a horizontal disposition as shown in FIG. 7(A) to a generally vertical disposition as shown in FIG. 7(E), the front ladder rest member 40 also rotates slightly less than 90° whereby a ladder suspended on the perpendicularly extending arms 19 and 41 joined to the ladder rest members of the front and rear four-bar linkage assemblies will be inclined to the horizontal. The foot end of the ladder is at a lower elevation relative to its upper end, as earlier shown in the view of FIG. 6 while the center of gravity of the ladder is lowered only slightly while going from the roof top disposition to the lowered disposition. This provides a significant reduction in force needed for operating the crank handle when raising and lowering ladders onto and from the vehicle's roof. It offers a further advantage that there is less interference with the vehicle's outside rear view mirrors because the top of the ladder does not descend as far when carried by the front 4-bar linkage assembly.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. In a ladder rack adapted to be attached to a utility vehicle to facilitate loading and unloading ladders onto and from the roof of said vehicle, the ladder rack including a front four-bar linkage assembly and a rear four-bar linkage assembly, each including a stationary bar member, a movable ladder support member and a pair of linkages operatively coupled between the stationary member and the movable ladder support member, the ladder rack further including an elongated drive shaft journaled for rotation in the stationary bar members of the front and rear four-bar linkage assemblies and connected to one of the pair of linkages comprising the front and rear four-bar linkage assemblies, the improvement comprising:

an offset member rigidly affixed to an end portion of the movable ladder support member of the front four-bar linkage assembly and a bracket rigidly joined to the stationary bar member of the front four-bar linkage assembly and pivotally joined to the offset member a predetermined distance from a longitudinal axis of the movable ladder support member of the front four-bar linkage assembly such that rotation of the elongated drive shaft simultaneously rotates the movable ladder support members in unison between a generally horizontal disposition and a generally vertical disposition and with the ladder support member of the front four-bar linkage assembly at a higher elevation than the ladder support member of the rear four-bar linkage assembly when said ladder support members are vertically disposed.

2. The ladder rack as in claim 1 wherein a ladder, when supported by the ladder support members of the front and rear four-bar linkage assembly, becomes inclined to the horizontal as the ladder support members assume their generally vertical disposition.

3. The ladder rack as in claim 1 wherein one of the pair of linkages of the front four-bar linkage assembly is rigidly affixed to the drive shaft and pivotally attached to the other of the pair of linkages of the front four-bar linkage assembly and said other linkage is pivotally connected to the movable ladder support member of the front four-bar linkage assembly.

4. The ladder rack of claim 1 and further including a hydraulic dampener operatively disposed between the stationary bar of the rear four-bar linkage assembly and the drive shaft to limit the speed that the drive shaft can rotate.

5. The ladder rack of claim 1 and further including a crank handle formed to the drive shaft.

6. A ladder rack adapted to a utility vehicle to facilitate loading and unloading ladders onto and from the roof of said vehicle comprising:

(a) a rear four-bar linkage assembly including a stationary bar adapted to be affixed to the roof of said utility vehicle and a ladder support bar pivotally coupled to the stationary bar by a pair of linkages;

(b) a front four-bar linkage assembly including a stationary bar adapted to be affixed to the roof of said utility vehicle parallel to and spaced from the stationary bar comprising the rear four-bar linkage assembly and a ladder support bar pivotally coupled to the stationary bar of the front four-bar linkage assembly at a location offset from a longitudinal axis of the stationary bar of the front four-bar linkage assembly;

(c) an elongated drive shaft journaled for rotation in the stationary bars of the rear and front four-bar linkage assemblies and operatively connected to the ladder support bars of the rear and front four-bar linkage assemblies; and (d) means for rotating the drive shaft to rotate both of the ladder support bars between a generally horizontal disposition atop the roof of the vehicle and a generally vertical disposition alongside the vehicle with the ladder support bar of the rear four-bar linkage assembly being at a lower elevation than the ladder support bar of the front four-bar linkage assembly when the ladder support bars are in the vertical disposition.

\* \* \* \* \*